United States Patent [19]

Nagel et al.

[11] Patent Number: 4,787,955

[45] Date of Patent: Nov. 29, 1988

[54] APPLICATION ROLLER FOR A LABELLING DEVICE

[75] Inventors: Gerhard Nagel, Augsburg; Ulf Koch, Eberbach, both of Fed. Rep. of Germany

[73] Assignee: Esselte Meto International GmbH, Fed. Rep. of Germany

[21] Appl. No.: 132,657

[22] Filed: Dec. 10, 1987

Related U.S. Application Data

[63] Continuation of Ser. No. 854,426, Apr. 21, 1986, abandoned.

[30] Foreign Application Priority Data

Apr. 30, 1985 [DE] Fed. Rep. of Germany ....... 3515610

[51] Int. Cl.[4] .......................... B65C 1/00; B44C 7/00; B44C 7/04; B60B 9/00

[52] U.S. Cl. .................................... 156/488; 156/541; 156/577; 156/582; 29/117

[58] Field of Search ............... 156/488, 493, 384, 540, 156/541, 542, 577, 216, 582, 584, DIG. 33, DIG. 39, DIG. 40, DIG. 48; 226/190, 194; 242/55.01, 118.1, 118.2, 118.11; 384/276, 280, 290; 29/117, 121.6, 122, 125, 130; 100/211

[56] References Cited

U.S. PATENT DOCUMENTS

| | | | |
|---|---|---|---|
| 2,982,493 | 5/1961 | Sibille | 242/118.2 |
| 3,198,411 | 8/1965 | Cope | 226/194 |
| 3,400,648 | 9/1968 | Izmailov et al. | 29/117 |
| 3,638,271 | 2/1972 | Pharris et al. | 29/117 |
| 3,659,797 | 5/1972 | Coy | 226/194 |
| 3,695,534 | 10/1972 | Treise | 242/55.01 |
| 4,249,973 | 2/1981 | Hamish et al. | 156/216 |
| 4,261,783 | 4/1981 | Finke | 156/488 |
| 4,609,320 | 9/1986 | Rubin | 226/190 |

FOREIGN PATENT DOCUMENTS 3207053 9/1983 Fed. Rep. of Germany .

*Primary Examiner*—Michael W. Ball
*Assistant Examiner*—Louis Falasco
*Attorney, Agent, or Firm*—Gerald J. Ferguson, Jr.

[57] ABSTRACT

An application roller (212) for a labelling device for applying self-adhesive labels comprises a cylindrical inner sleeve (211). It further comprises a cylindrical outer sleeve (212) whose internal diameter is greater than the external diameter of the inner sleeve (211). An intermediate sleeve (213) disposed between the inner sleeve (211) and the outer sleeve (212) with radial spacing between said two sleeves is connected with one end to the inner sleeve (211) and with the other end to the outer sleeve (212).

7 Claims, 2 Drawing Sheets

APPLICATION ROLLER FOR A LABELLING DEVICE

Figure 1:
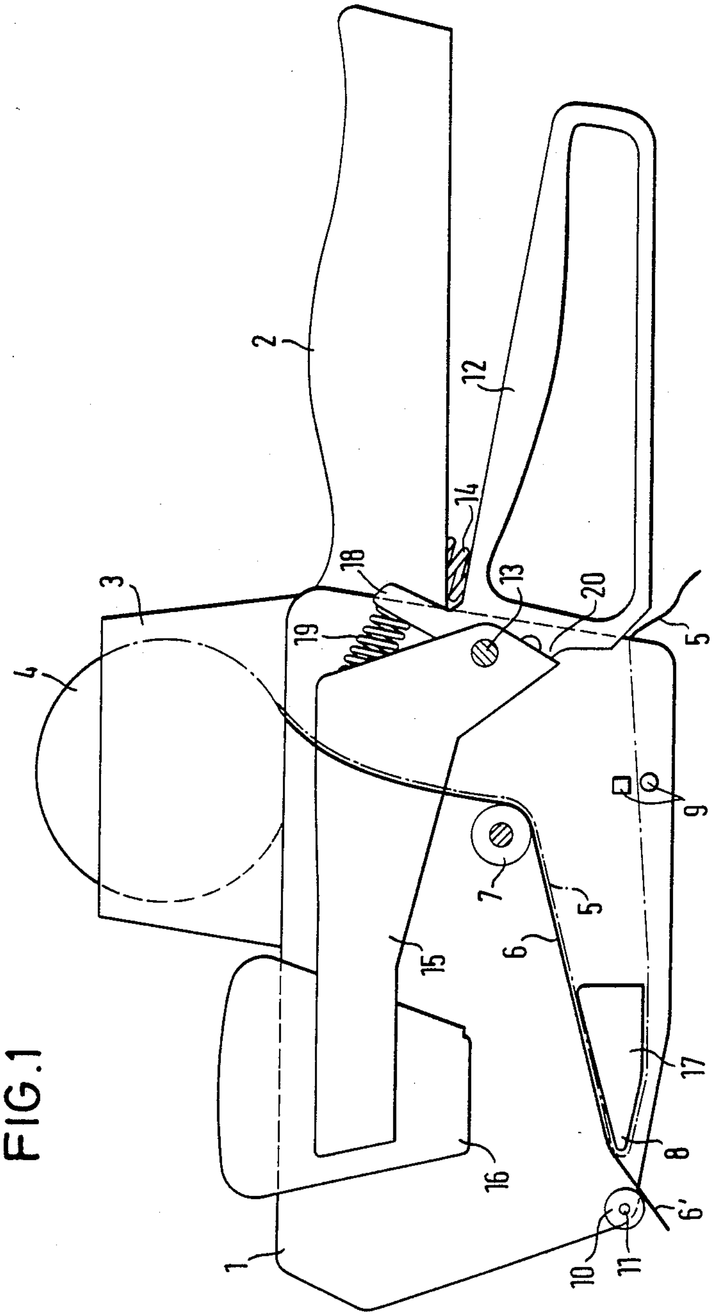

This application is a continuation of Ser. No. 854,426, filed Apr. 21, 1986, now abandoned.

The invention relates to an application roller for a labelling device for attaching self-adhesive labels.

Such an application roller is known from DE-OS No. 3,207,053. This known application roller is mounted in a centre zone of its longitudinal extent on a shaft, said centre zone being adjoined on both sides by shaft-passage regions which extend up to the end faces of the application roller and in which the application roller surrounds the shaft with clearance. The purpose of this application roller is to stick to articles labels which are imprinted by means of the labelling device and which at the end of an operating cycle of the labelling device assume a position beneath the application roller. The application roller is rolled over the article, the label being simultaneously firmly adhered. The particular configuration of the known application roller also has the purpose of permitting a clean attachment of the self-adhesive labels even when the labelling device is not exactly guided in the rolling movement but is moved in such a manner that the application roller is applied in a tilted state to the article. The clearance at the shaft-passage regions of the application roller permits an inclined position of the application roller so that even when the labelling device is held inclined said roller rolls cleanly over the article to be labelled. However, a requirement for this adaptation of the application roller to the surface on which the label is to be applied is a resiliently deformable shaft which permits the inclined position of the application roller. In DE-OS No. 3,207,053 various possibilities for forming the shaft are illustrated and described which give the necessary resilient deformability. By the combination of the particular configuration of the application roller and the specific form of the shaft the adaptation of the application roller to the surface of the article to be labelled can be achieved even when an application roller of hard material is used which does not deform under the forces occurring when using the labelling device. The use of such a hard material is desirable because this substantially reduces the danger of an imprint applied to the label being smudged.

The fact that the known application roller requires a specially formed shaft is unfavourable as regards the production and spare-parts stocking.

The invention is based on the problem of providing an application roller of the type outlined at the beginning with which the yieldability necessary for the clean attachment of a label to a surface is achieved even when using a hard material without further components of the labelling device in which the application roller is used having to be formed in special manner.

According to the invention this problem is solved by a cylindrical inner sleeve, a cylindrical outer sleeve whose internal diameter is greater than the external diameter of the inner sleeve, and an intermediate sleeve which is disposed between the inner sleeve and the outer sleeve with radial spacing from said two sleeves and which is connected with one end to the inner sleeve and with the other end to the outer sleeve.

Even when mounted with a simple cylindrical steel shaft the application roller according to the invention can execute adaptation movements to the surface of an article to be labelled when applied for example tilted to said surface. The material of the application roller can readily be so hard that there is no danger of the imprint on the label to be applied being smudged. The yieldability of the application roller is provided by the intermediate sleeve with the particular form of its connection to the outer sleeve and the inner sleeve. The application roller can adapt itself not only to surfaces lying inclined to the bearing axis but can also be displaced parallel to said axis and this gives a certain damping effect when the operator brings the application roller rapidly and with impetus into contact with the surface to be labelled.

Advantageous further developments of the invention are characterized in the subsidiary claims. In the preferred embodiment in which at both ends of the inner sleeve cylindrical shaft journals are formed the application roller can be inserted into the labelling device without having to have its own bearing shaft; the shaft journals engage in bearing openings which are provided to accommodate the otherwise necessary bearing shaft.

Figure 2:
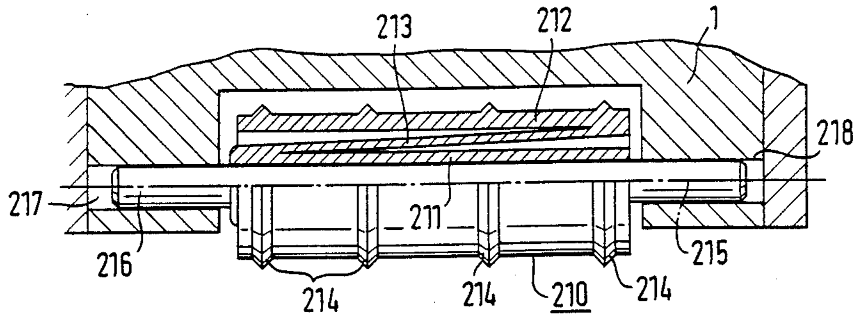
Figure 3:
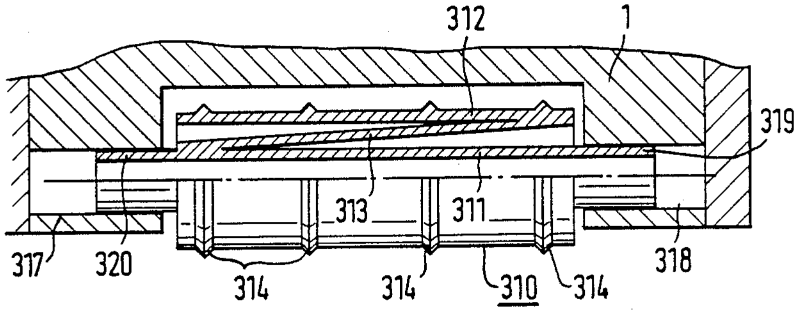
Figure 4:
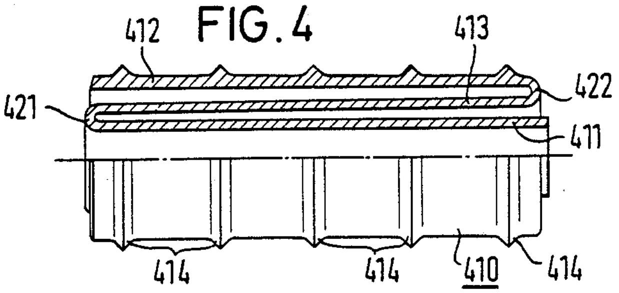
Figure 5:
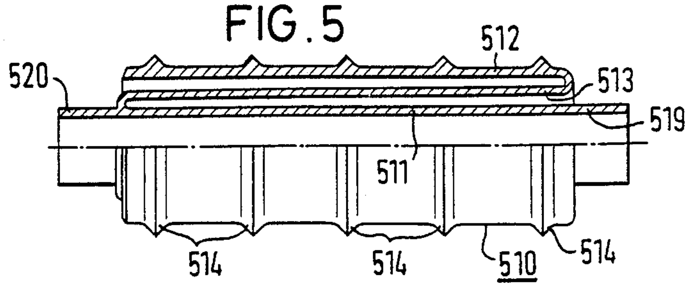

The invention will be explained by way of example with the aid of the drawings, wherein:

FIG. 1 shows a schematic representation of a labelling device in which the application roller according to the invention can be used, FIG. 2 is a partially sectioned view of a first embodiment of the application roller according to the invention, the part of the labelling device supporting the application roller also be shown in section, FIG. 3 is a similar view to FIG. 2 of a second embodiment of the application roller according to the invention which can be inserted into the labelling device without using a bearing shaft, FIG. 4 shows a third embodiment of the application roller according to the invention which can be inserted in the labelling device using a bearing shaft, and FIG. 5 shows a fourth embodiment of the application roller according to the invention which like the embodiment of FIG. 3 can be inserted into a labelling device without bearing shaft.

The labelling device illustrated in FIG. 1 will be described only by way of example of a device in which the application roller to be explained in detail hereinafter can be used. The illustration is only schematic and shows only the components necessary for understanding the mode of operation of the labelling device.

The labelling device of FIG. 1 comprises a housing 1 to which a grip 2 is attached. At the upper side of the housing there is a well 3 for receiving a supply roll 4 of a carrier tape 5 with self-adhesive labels 6 adhering thereto. The carrier tape 5 runs in the device from the well 3 initially downwardly and then after deflection at a roller 7 forwardly to a dispensing edge 8 at which the carrier tape 5 is deflected and past a feed means 9 illustrated schematically to the housing rear end. In front of the dispensing edge 8 an application roller 10 is mounted in the housing rotatably about a shaft 11 and with said roller a label 6' disposed in the dispensing position and detached from the carrier tape 5 at the dispensing edge 8 can be adhered to an article by rolling the application roller 10 thereover.

Disposed beneath the grip 2 is an operating lever 12 which is mounted rotatably about a shaft 13. Between the grip 2 and the operating lever 12 there is a spring 14 which continuously tends to press the operating lever 12 into the rest position illustrated in FIG. 1. In the housing 1 there is also a printing mechanism lever 15 likewise rotatably mounted about the shaft 13. Said printing mechanism lever 15 carries a printing mechanism 16 with the aid of which a self-adhesive label 6 disposed on a printing table 17 can be imprinted. Between an arm 18 of the operating lever 12 and the printing mechanism lever 15 a spring 19 is disposed which serves to transmit a movement of the operating lever 12 directed against the grip 2 to the printing mechanism lever 15. In the rest position illustrated in FIG. 1 the printing mechanism lever 15 is held in the raised position by a nose 20 on the operating lever 12.

For a brief description of an operating cycle of the device illustrated in FIG. 1 it will be assumed that no self-adhesive label is yet disposed in the dispensing position beneath the application roller 10. To initiate an operating cycle the operating lever 12 is pulled against the grip 2 and this results in the printing mechanism lever 15 being pivoted anti-clockwise about the shaft 13 due to the action of the arm 18 and the spring 19 so that the printing mechanism 16 is lowered onto the printing table 17. On striking the printing table 17 the printing mechanism 16 produces an imprint on the self-adhesive label 6 disposed at that instant on the printing table 17. Via a lever connection not shown the feed means 9 is simultaneously moved from the position illustrated in FIG. 1 in the direction towards the printing table 17 along the carrier tape 5. On release of the operating lever 12 the spring 14 moves said lever back again into the starting position illustrated in FIG. 1, the nose 20 again pivoting the printing mechanism lever 15 clockwis about the shaft 13 into the starting position illustrated of said lever. At the same time the feed means 9 is again returned to its starting position illustrated in FIG. 1; on this movement it is however firmly in engagement with the carrier tape 5 so that the latter is pulled about the dispensing edge a distance corresponding to the length of a self-adhesive label. When this is done at the dispensing edge 8 a self-adhesive label detaches itself from the carrier tape 5 and moves into the position of the self-adhesive label 6' beneath the application roller 10. The self-adhesive label 6' can now be stuck to an article by rolling the application roller 10 thereon.

FIG. 2 shows a first embodiment of an application roller 210 for use in the device of FIG. 1. It is also apparent how said application roller 210 is mounted in the device.

The application roller 210 comprises an inner sleeve 211, an outer sleeve 212 and an intermediate sleeve 213. The outer sleeve 212 is provided with projections 214 which annularly surround the outer sleeve. Said projections 214 prevent a full area contact of the outer peripheral surface of the outer sleeve 212 with the particular label to be applied so that the imprint previously applied to the label is not impaired. As apparent from FIG. 2 the intermediate sleeve 213 is connected at one end to the inner sleeve 211 and at the other end to the outer sleeve 212. Apart from the connecting points with the inner sleeve and the outer sleeve the intermediate sleeve 213 is spaced radially from said two sleeves and this makes it possible for the outer sleeve 212 to be movable relative to the inner sleeve 211. The outer sleeve 212 can also be displaced parallel to the axis 215 although a displacement is also possible such that the outer peripheral surface of the outer sleeve 212 extends inclined to the axis 215. In this manner a good adaptation of the application roller 210 to the surface to which the self-adhesive label 6' is to be stuck is possible. For mounting the application roller in the device of FIG. 1 the inner sleeve 211 is mounted on a bearing shaft 216 which is accommodated in corresponding bearing bushes 217, 218 in the housing 211 of the device of FIG. 1.

The bearing shaft 216 required for the embodiment of the application roller 210 of FIG. 2 is a simple steel pin which need not have any particular configuration for obtaining the desired yieldability and adaptability of the application roller 210 such that the outer sleeve 212 is connected to the inner sleeve 211 by respective resiliently deformable connections with the intermediate sleeve 213.

FIG. 3 shows a second embodiment of an application roller 310. Like the application roller 210 of FIG. 2 the application roller 310 also consists of an inner sleeve 311, an outer sleeve 312 and an intermediate sleeve 313. The intermediate sleeve 313 is connected at one end to the inner sleeve 311 and at the other end to the outer sleeve 312. The application roller 310 has the same yieldability and adaptability as the application roller 210 of FIG. 2. In contrast to the application roller 210 of FIG. 2 in the application roller 310 on the inner sleeve on both sides shaft journals 319, 320 are integrally formed with the aid of which the application roller 310 can be mounted in the bearing bushes 317, 318 in the housing 1 of the device of FIG. 1. Thus, in this embodiment no separate bearing shaft is required for the application roller 310 and consequently one component can be dispensed with.

FIG. 4 illustrates a third embodiment of an application roller 410. Said application roller 410 is substantially identical to the application roller 210 of FIG. 2; only the intermediate sleeve 413 is made in different manner. Whereas in the embodiments of FIGS. 2 and 3 the ends of the intermediate sleeve 213 and 313 each extend at an acute angle to the inner sleeves 311 and 312 and the outer sleeves 212 and 313 respectively and are then connected thereto so that the intermediate sleeves 213, 313 have the form of a truncated cone, in the embodiment of FIG. 4 the intermediate sleeve 413 runs almost parallel to the inner sleeve 411 and the outer sleeve 412. The ends of the inner sleeve 413 are each connected via an arcuate portion 421 and 422 to the inner sleeve 411 and outer sleeve 412 respectively. The embodiment of the application roller 410 of FIG. 4 requires like the embodiment of FIG. 2 the use of a separate bearing shaft for mounting in the labelling device.

In the fourth embodiment of the application roller 510 illustrated in FIG. 5 at the two ends of the inner sleeve 511 two shaft journals 519 and 520 are formed so that this embodiment like the embodiment of FIG. 3 can be mounted in the labelling device without using a separate bearing shaft. Otherwise the embodiment of FIG. 5 corresponds to that of FIG. 4.

By the use of an intermediate sleeve for connecting the inner sleeve to the outer sleeve and by the special type of connection of the intermediate sleeve with the respective inner sleeve and the respective outer sleeve the desired yieldability of the application roller is obtained which is necessary for clean attachment of a label to a surface. The application roller may be made from hard material as is desired if a smudging of the imprints applied to the labels is to be avoided.

In the above examples of embodiment the intermediate sleeves each have closed outer surfaces but this need not necessarily be the case. To save weight and material and also to influence the spring properties the intermediate sleeves can also have interrupted peripheral surfaces so that for the connection between the respective inner sleeves and outer sleeves only web-like connecting strips remain. However, this does not change the desired mode of operation.

We claim:

1. A labelling device for attaching self-adhesive labels to a substrate, comprising in combination: a labelling device having a housing, a means for supplying labels, a means for feeding labels, and an application roller for applying labels to a substrate;

said application roller mounted for rotation relative to said housing, and including a generally cylindrical inner sleeve having a predetermined external diameter, a generally cylindrical outer sleeve having a predetermined internal diameter greater than the predetermined external diameter of said inner sleeve, and an intermediate sleeve for connecting the inner sleeve and the outer sleeve such that said outer sleeve is generally coaxially disposed about said inner sleeve, said intermediate sleeve being disposed between the inner sleeve and the outer sleeve, said outer sleeve having two ends, said inner sleeve having two ends which are respectively adjacent the two ends of said outer sleeve, said intermediate sleeve having a first end and a second end, said intermediate sleeve being connected at the first end thereof to the one end of the inner sleeve, and the second end of the intermediate sleeve being connected to an end of said outer sleeve at an end thereof adjacent the other end of said inner sleeve, whereby said outer sleeve is resiliently movable relative to said inner sleeve during application of a label to the substrate.

2. A labelling device according to claim 1, wherein the inner sleeve, the outer sleeve are of approximately the same length.

3. A labelling device according to claim 1 or 2, wherein the intermediate sleeve is made frusto-conical and thus has at one end a greater diameter and at the other end a smaller diameter, said end having the greater diameter being connected to the outer sleeve and said other end having the smaller diameter being connected to the inner sleeve.

4. A labelling device according to claim 1, both ends of the inner sleeve include cylindrical shaft journals.

5. A labelling device according to claim 2, wherein at both ends of the inner sleeve, cylindrical shaft journals are disposed.

6. A labelling device according to claim 3, wherein at both ends of the inner sleeve, cylindrical shaft journals are disposed.

7. A labelling device according to claim 1, wherein at both ends of the inner sleeve, cylindrical shaft journals are disposed.

* * * * *